(12) United States Patent
Jiang et al.

(10) Patent No.: US 9,900,030 B2
(45) Date of Patent: Feb. 20, 2018

(54) TRANSMITTER HARMONICS CALIBRATION TO IMPROVE TRANSMIT LINEARITY

(71) Applicant: Futurewei Technologies, Inc., Plano, TX (US)

(72) Inventors: Hong Jiang, Kernersville, NC (US); Zhihang Zhang, Cary, NC (US); Jamil Forrester, Summerfield, NC (US); Wael Al-Qaq, Oak Ridge, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/097,898

(22) Filed: Apr. 13, 2016

(65) Prior Publication Data

US 2017/0302308 A1 Oct. 19, 2017

(51) Int. Cl.
*H04B 15/00* (2006.01)
*H04B 1/04* (2006.01)

(52) U.S. Cl.
CPC .................. *H04B 1/0475* (2013.01)

(58) Field of Classification Search
CPC ................................... H04B 1/0475
See application file for complete search history.

(56) References Cited

U.S. PATENT DOCUMENTS

| 8,761,708 B2* | 6/2014 | Chen ...................... H04B 15/04 455/296 |
| 9,160,461 B2* | 10/2015 | Hwang .................. H04B 15/00 |
| 9,236,960 B1* | 1/2016 | Tinella ................... H04B 17/00 |
| 9,425,835 B2* | 8/2016 | Seckin ................. H04B 1/0475 |
| 2007/0190959 A1* | 8/2007 | Kim ...................... H03D 7/1425 455/313 |
| 2009/0202022 A1* | 8/2009 | Kaczman ............ H04L 27/3863 375/319 |
| 2011/0217940 A1* | 9/2011 | Oliaei ....................... H03F 3/16 455/127.2 |
| 2012/0274370 A1* | 11/2012 | Fortier .................... H03L 7/099 327/156 |
| 2015/0280755 A1* | 10/2015 | Jiang .................... H04B 1/0475 455/114.3 |

* cited by examiner

*Primary Examiner* — Dac Ha
(74) *Attorney, Agent, or Firm* — Schwegman Lundberg & Woessner, P.A.

(57) ABSTRACT

An apparatus comprises: radio frequency (RF) transceiver circuitry for electrical coupling to an antenna and including: a local oscillator (LO) circuit configured to generate a LO signal, and a mixer circuit configured to mix a CW tone signal with the LO signal; a measurement receiver path configured to measure an antenna signal, wherein the antenna signal includes the CW tone signal mixed with the LO signal; and baseband processing circuitry electrically coupled to the measurement receiver path and configured to adjust a clock duty ratio of the LO signal to reduce one or more counter intermodulation (CIM) signals in the antenna signal.

16 Claims, 5 Drawing Sheets

TRANSMITTER HARMONICS CALIBRATION TO IMPROVE TRANSMIT LINEARITY

TECHNICAL FIELD

The present application is related to radio frequency transmitters, and in particular to transmitter calibration using a local oscillator harmonic cancellation transmitter architecture.

BACKGROUND

Linear in-phase quadrature (I/Q) transmitters typically use a local oscillator (LO) to drive transmit (Tx) mixers in which an input baseband Tx signal for transmission and a LO signal are mixed to produce a desired or wanted radio frequency (RF) Tx signal. The LO signal can be a square wave signal, and the mixing of the LO signal harmonics and the input baseband Tx signal under a non-linear output stage and a power amplifier (PA) normally results in generating third and fifth order distortions (e.g., third order counter intermodulation (CIM3) and the fifth order counter intermodulation (CIM5)) in the output Tx signal. Such distortions may fall into the spurious emissions region and LO harmonics cancellation transmitter may be used to cancel the LO harmonics in order to improve CIM3 and CIM5 performance. However, cancellation of the LO harmonics can be limited due to non-ideal circuit elements.

SUMMARY

Radio frequency transceivers are subject to harmonic distortion in their transmitter. The present subject matter provides a local oscillator harmonic cancellation transmitter architecture to reduce harmonic distortion.

An apparatus example includes radio frequency (RF) transceiver circuitry for electrical coupling to an antenna and including: a local oscillator (LO) circuit configured to generate a LO signal; and a mixer circuit configured to mix a continuous wave (CW) tone signal with the LO signal; a measurement receiver path configured to measure an antenna signal, wherein the antenna signal includes the CW tone signal mixed with the LO signal; and baseband processing circuitry electrically coupled to the measurement receiver path and configured to adjust a clock duty ratio of the LO signal to reduce one or more counter intermodulation (CIM) signals in the antenna signal.

A method example includes transmitting a continuous wave (CW) tone signal up-converted by mixing with a square-wave local oscillator (LO) signal generated using a LO circuit; measuring an antenna signal using a measurement receiver path of the RF communication device; and adjusting a clock duty ratio of the LO signal to reduce one or both of a third order counter intermodulation (CIM3) signal and a fifth order counter intermodulation (CIM5) signal in the antenna signal.

Embodiments include a computer readable storage medium including instructions that, when executed by baseband processing circuitry of an RF communication device, cause the RF communication device to: generate a continuous wave (CW) tone signal in a calibration mode, wherein the CW tone signal is up-converted by circuitry of the RF communication device by mixing with a square-wave local oscillator (LO) signal to generate an antenna signal; initiate one or more measurements of the antenna signal; and change a value of a correction code to adjust a clock duty ratio of the LO signal to reduce one or both of a third order counter intermodulation (CIM3) signal and a fifth order counter intermodulation (CIM5) signal in the antenna signal.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Mixing of an input baseband Tx signal for transmission with a LO signal to produce a desired output Tx signal can result in unwanted distortion in the output Tx signal. Linear I/Q transmitters typically use a square-wave LO signal to drive the signal mixers of the RF transceiver circuitry. This normally results in third and fifth order distortions that can be referred to as the third order counter intermodulation (CIM3) signal and the fifth order counter intermodulation (CIM5) signal. Transceiver circuits can be designed to cancel the unwanted harmonics, but the cancelling is typically imperfect due to the LO generation circuit being non-ideal.

An important component of CIM3/CIM5 distortion is the third harmonic term. This is the 3fLO−fbb term, where fLO is fundamental frequency of the LO signal and fbb is the frequency of the desired transmit signal. The mixing mechanism is represented mathematically as shown below:

$$(3*fLO-fbb)-2*(fLO+fbb)=fLO-3*fbb \qquad \text{CIM3:}$$

$$4*(fLO+fbb)-(3*fLO-fbb)=fLO+5*fbb. \qquad \text{CIM5:}$$

Operation in a cellular network (e.g., third generation partnership project (3GPP) long term evolution (LTE) cellular network) can include stringent requirements for CIM performance of a transmitting device. Thus, it is desirable to reduce the level of CIM signals for LTE mode of operation. An N-Phase transmitter can be used to meet the signal requirements for LTE operation, where N is an integer greater than or equal to five (N≥5), which ideally cancels the 2nd to N−2 harmonics completely.

For an 8-Phase transmitter, 8-Phase LO signals are generated. The minimum frequency for a voltage controlled oscillator (VCO) used to produce the LO signals is 4*fLO. Because a lower VCO frequency means lower energy consumption, 4*fLO is the preferred frequency over other option such as 8*fLO or 12*fLO. However, to use 4*fLO for the VCO frequency, the LO signal generation circuit uses both the rising and falling edge of the VCO clock. A non-perfect duty ratio of VCO (deviating from 50% "on" and 50% "off") may create a mismatch in the final LO signal and the harmonics may not be cancelled perfectly.

Figure 1:
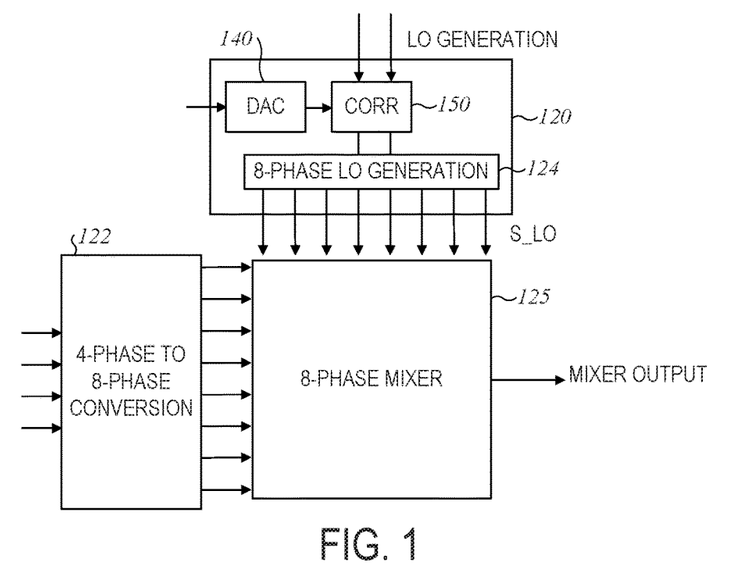
FIG. 1 is a block diagram of portions of a local oscillator circuit and a mixer circuit.

FIG. 1 is a block diagram of portions of an example of an RF mixer that includes a LO circuit 120 and a mixer circuit 125. The LO circuit 120 generates an 8-Phase LO signal. The mixer circuit 125 is an 8-Phase mixer circuit that mixes the 8-Phase baseband signal with the 8-Phase LO signal to create the desired RF signal at the mixer output. Ideally, an 8-Phase mixer can remove unwanted harmonics up to the $6^{th}$ order, thereby improving CIM performance. The example in FIG. 1 includes a 4-phase to 8-phase conversion circuit 122 that converts a 4-phase input signal to the 8-phase output signal. The input to the LO circuit 120 is received from a VCO. In the ideal case, each LO signal of the 8 LO signals is "on" 12.5% of the time (100/N, where N=8) and "off" the remainder of the clock period.

Figure 2:
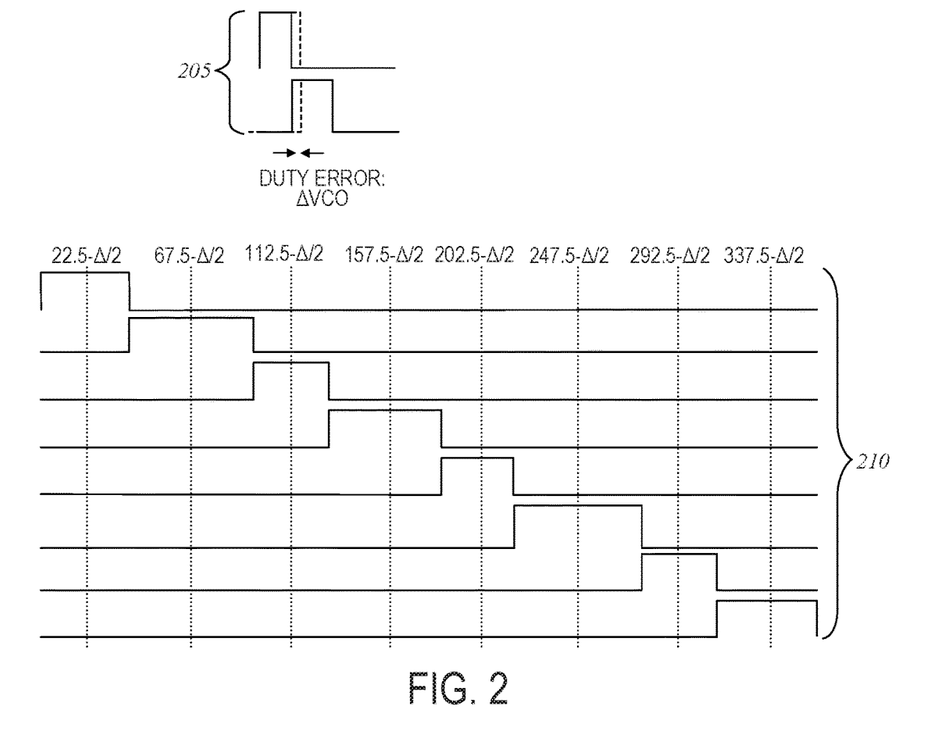
FIG. 2 are timing diagrams of a voltage controlled oscillator signal and local oscillator signals.

FIG. 2 includes a timing diagram 205 of a VCO signal with a non-perfect duty ratio. The duty ratio error in the VCO signal is shown as $\Delta_{VCO}$. Without correction, the VCO signal error will translate to the 8 LO signals at the output of the LO circuit 120. FIG. 2 also includes timing diagrams 210 of the 8 LO signals in the non-ideal case with a non-zero $\Delta_{VCO}$. Because of the VCO duty ratio error $\Delta_{VCO}$, instead of all the LO signals having a duty ratio of 12.5%, the duty ratio of the LO signals follows a pattern of 12.5−Δ, 12.5+Δ, 12.5−Δ, 12.5+Δ, 12.5−Δ, 12.5+Δ, 12.5−Δ, 12.5+Δ, where $\Delta=\Delta_{VCO}/4$ when the VCO frequency is 4*fLO.

Returning to FIG. 1, the LO circuit 120 includes a digital-to-analog converter (DAC) circuit and a correction (CORR) circuit to adjust the 8 LO signals to reduce the error in the VCO signal. The VCO signal is input to a buffer circuit that can adjust the duty ratio of the input VCO signal according to a voltage received from the CORR circuit 150. The value of the voltage provided to the buffer circuit by the CORR circuit 150 is adjustable according to a voltage value received from the DAC circuit 140. The voltage value output from the DAC circuit 140 to the CORR circuit 150 is set by a digital value written into the DAC circuit 140 by the baseband processor. Using the voltage received from the DAC circuit 140, the CORR circuit 150 corrects the duty ratio error ($\Delta_{VCO}$) in the input VCO signal so that the 8-Phase LO generation circuit 124 can generate the 8-Phase LO signals with reduced duty ratio error. If the frequency of the VCO is 4*fLO, ideally the 8-Phase LO generation circuit 124 uses both the rising and falling edges to generate the 12.5% duty ratio LO clock signal. Reducing the duty ratio error reduces the mismatch value (Δ, described above) in the 8-Phase LO signals, which improves cancelling of undesired harmonics. Because the baseband processor adjusts the DAC circuit, the baseband processor controls how much adjustment is made to the duty ratio.

Figure 3:
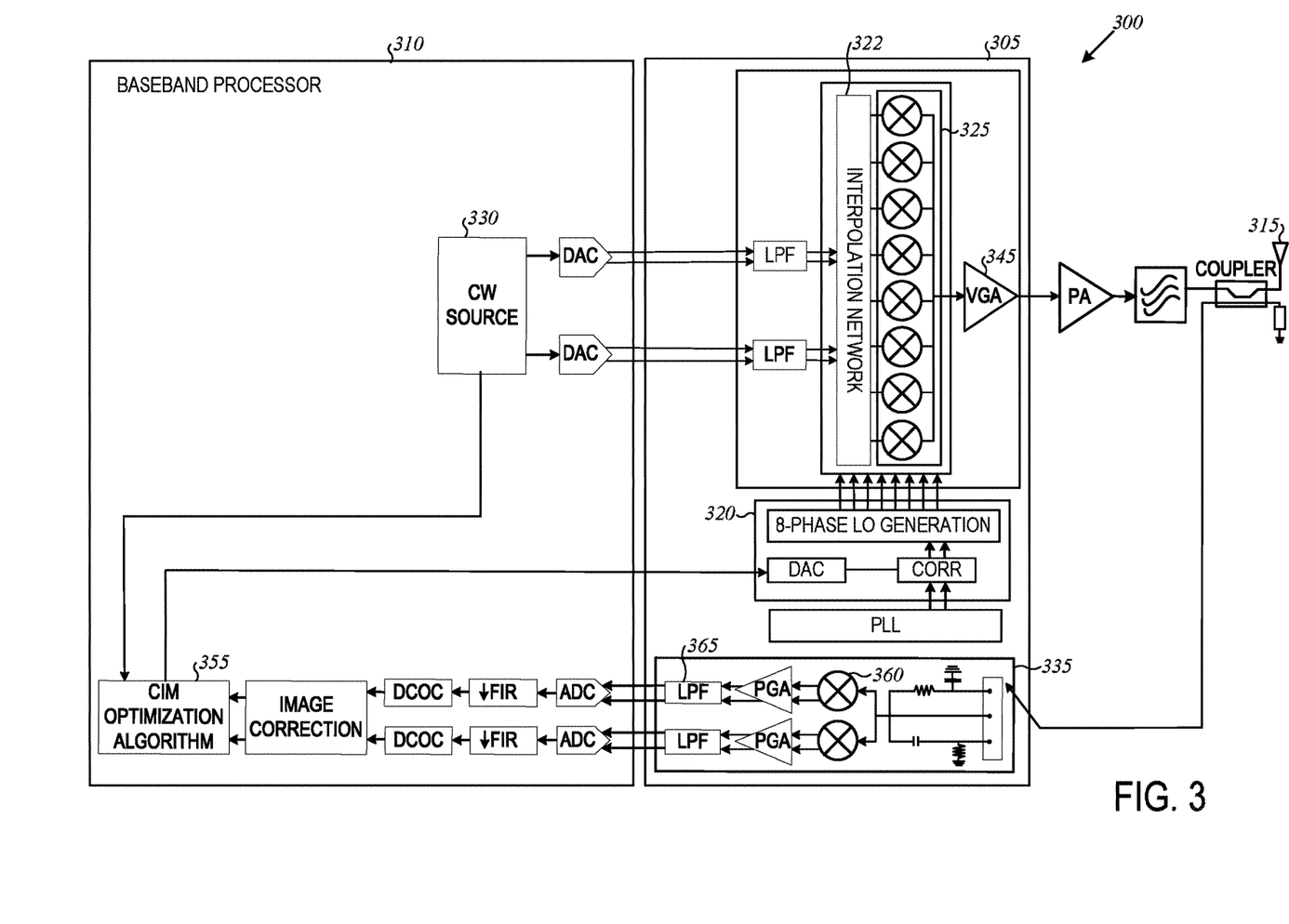
FIG. 3 is a block diagram of portions of example of an RF communication device that reduces signal harmonics in a transmitted signal.

FIG. 3 is a block diagram of portions of example of an RF communication device that reduces signal harmonics in the transmitted signal. In some embodiments, the device 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an internet of things (IoT) device (e.g., a smart sensor), or other device that may receive and/or transmit information wirelessly. In some embodiments, the device 300 may include one or more of a keyboard, a display, a non-volatile memory port, multiple antennas, a graphics processor, an application processor, speakers, and other mobile device elements. The display may be an LCD screen including a touch screen.

The device 300 includes RF transceiver circuitry 305 and digital baseband processing circuitry 310. The RF transceiver circuitry 305 may be electrically coupled to one or more antennas 315. The one or more antennas 315 utilized by the device 300 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna.

The RF transceiver circuitry 305 also includes an RF mixer. The RF mixer includes a LO circuit 320 and a mixer circuit 325. The mixer circuit 325 may be an N-phase mixer circuit where N≥5. In the example of FIG. 3, N=8 and the mixer circuit is an 8-Phase mixer circuit as in the example of FIG. 1. Interpolation network 322 may include a 4-Phase to 8-Phase conversion circuit that converts a 4-Phase input signal (LPF) to the 8-Phase output signal. The 4-Phase input signal can be a 4-phase Differential IQ signal (e.g., Ip=0 degree, Qp=90 degree, In=180 degree, Qn=270 degree). The interpolation network 322 generates the additional 45 degree, 135 degree, 225 degree and 315 degree signals to create the 8-Phase signal. The additional signals can be generated by the 4-Phase to 8-Phase conversion circuit using the input 4-Phase differential IQ signals (e.g., the 45, 135, 225, and 315 degree signals can be generated as sqrt(2)*(Ip+Qp), sqrt(2)*(Qp+In), sqrt(2)*(In+Qn), and sqrt(2)*(Qn+Ip), respectively).

The LO circuit 320 includes a phase locked loop (PLL) circuit and generates 8 LO signals (such as LO circuit 120 of FIG. 1), and the mixer circuit 325 mixes the 8-Phase signal with the 8-Phase LO signal. The 8 output signals from the 8 branches are summed together to create the desired 8-Phase RF signal at the mixer output. The output of the mixer circuit 325 can be provided to variable gain amplifier 345 (VGA).

The baseband processing circuitry 310 may include memory arranged to configure the various elements of the device 300 to perform the operations described herein. The memory may be used to store information for configuring the baseband processing circuitry 310 to perform the operations. The baseband processing circuitry 310 may include a digital signal processor, ASIC, microprocessor, or other type of baseband processor performing instructions embodied in one or both of software and firmware.

In normal operating mode of device 300, the 4-Phase baseband signal is provided to the interpolation network for conversion, mixing and transmitting by the RF transceiver circuit 305. The example of FIG. 3 shows the portions of the baseband processing circuitry 310 used in a calibration mode and the operation signal source is not shown.

The baseband processing circuitry 310 includes a continuous wave (CW) tone signal source circuit 330. During a calibration mode of device 300, the baseband processing circuitry 310 generates a single CW tone signal with a fundamental tone frequency. In certain embodiments, the CW tone signal may be provided by a separate device during the calibration mode. The generated CW tone signal is mixed with an LO signal using mixer circuit 325 to generate a Tx signal provided to the antenna 315 for transmitting.

The RF transceiver circuitry 305 also includes a measurement receiver path 335. The measurement receiver path 335 is a feedback circuit path from the antenna 315 to the baseband processing circuitry 310. During the calibration mode, the Tx signal is generated using the single CW tone signal and the antenna signal is collected using the measurement receiver path 335. The mixer circuit 325 will remove the undesired harmonics if the input VCO signal is ideal. In some embodiments, the measurement receiver path 335 includes mixers 360 to down-convert the antenna signal to the CW tone signal. The measurement receiver path 335 may include filter circuitry 365 to isolate the CIM3 and CIM5 signals in the signal provided to the baseband processing circuitry 310.

The baseband processing circuitry 310 receives the signal from the measurement receiver path 335. By measuring the CIM3 signal and CIM5 signal in the received signal, a CIM optimization algorithm 355 performed by the baseband processing circuitry 310 estimates a CIM correction code to write to the DAC circuit 140 of FIG. 1. Based on the value of the CIM correction code, the CORR circuit 150 of FIG. 1 reduces the error in the duty ratio of the VCO signal to reduce the error in the LO signals. The baseband processing circuitry 310 may perform finite impulse response (FIR) filtering, DC offset correction (DCOC), and Image Correction to correct error introduced by the circuitry of the measurement receiver path 335.

Figure 4:
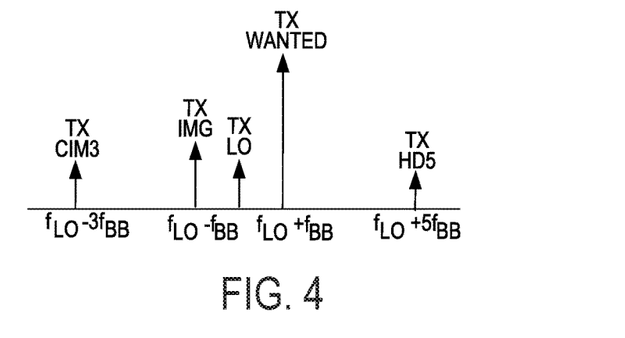
FIG. 4 is a representation of an example of a transmit signal in the frequency domain.

FIG. 4 shows a representation of an example of a Tx signal in the frequency domain. The example shows a fundamental frequency of the Tx signal at $f_{LO}+f_{BB}$ (the desired Tx signal or Tx wanted), an image of the Tx signal at $f_{LO}-f_{BB}$, and distortion of the Tx signal corresponding to CIM3($f_{LO}-3f_{BB}$) and CIM5($f_{LO}+5f_{BB}$). Using the antenna signal information provided by the measurement receiver path 335, the baseband processing circuitry 310 changes the CIM correction code to reduce the CIM3 and CIM5 signal components in the antenna signal by adjusting the clock duty ratio of the LO signal. The adjustment to the LO circuit may minimize the duty ratio error shown in the LO signals of FIG. 1. The baseband processing circuitry 310 may adjust the LO circuit 320 to reduce the amplitude of the CIM3 and CIM5 signals.

To reduce the amplitude of the CIM3 and CIM5 signals, the baseband processing circuitry 310 changes the value of the DAC circuit 140 in FIG. 1 to adjust the VCO signal at the LO circuit 320. Proper adjustment of the VCO signal can minimize the error in the VCO signal and consequently reduce CIM3 and CIM5. In some embodiments, writing a CIM correction code to the DAC of the LO circuit 320 adjusts the clock duty ratio of the LO signals. Writing a value to a register of the DAC 140 produces a signal adjustment to the VCO using the value of the register. Thus, adjusting the LO duty ratio correction code written to the LO circuit 320 can be used to calibrate the LO circuit 320 and reduce the CIM3 and CIM5 signal components. A challenge is to make the automatic calibration of the LO circuit 320 find the correct code quickly and accurately to minimize its impact on the production process.

Figure 5:
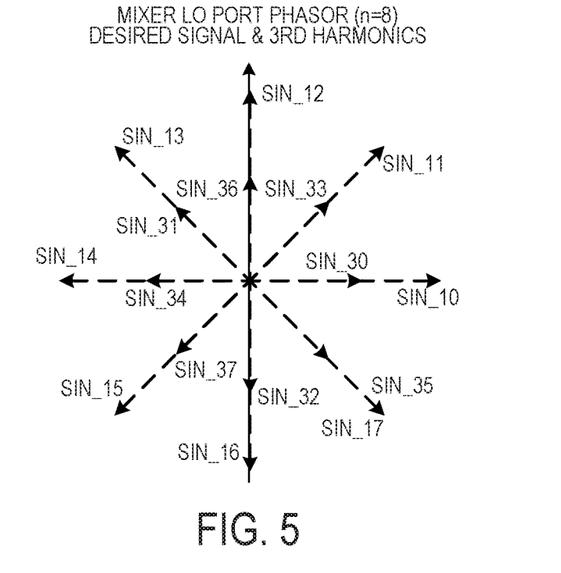
FIG. 5 is plot of the phasors of the local oscillator desired signals and local oscillator undesired third harmonic signals at the local oscillator signal port to a mixer circuit.
Figure 6A:
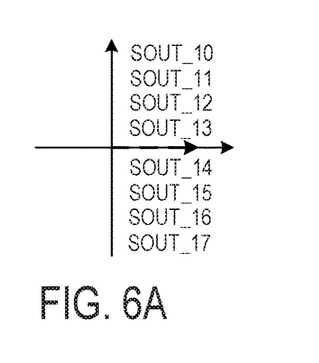
FIGS. 6A and 6B are plots of the phasors at a mixer circuit output for the desired fundamental signal and the undesired 3rd harmonics signal.
Figure 6B:
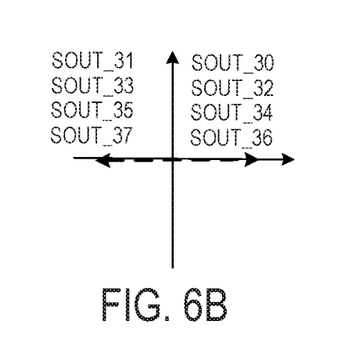

FIG. 5 is plot of the phasors of the LO desired signals (Sin_1X) and LO undesired third harmonic signals (Sin_3X) at the LO signal port to the 8-phase mixer. FIGS. 6A and 6B show a plot of the phasors at the mixer output (after mixing) for the desired fundamental signal (FIG. 6A) and undesired 3rd harmonics signal (FIG. 6B). For the fundamental Tx signal, all 8 phasors add in phase. For the 3rd harmonics signals, the even signals (0/2/4/6) add in phase at phase angle X (In FIG. 6B, the phase angle X=0), and the odd signals (1/3/5/7) add out of phase with a phase angle of X+180°. If all phasors are equal in amplitude, then the 3rd harmonics of the LO (3LO) are completely cancelled. In the non-ideal case, the VCO duty ratio error causes the amplitude of the even signals (0/2/4/6) to be different from the odd signals (1/3/5/7), which leads to a non-perfect cancellation of the 3LO.

Assuming each LO signal is a square wave, we know that the signals 0/2/4/6 have "12.5−Δ % duty cycle "on time," and the signals 1/3/5/7 have 12.5+Δ % duty cycle "on-time." Written in phase angle terms, signals 0/2/4/6 have an "on-time" of $$2*\alpha 1=\pi/4-\epsilon,$$

and the signals 1/3/5/7 have an "on-time" of $$2*\alpha 2=\pi/4+\epsilon,$$

where $\epsilon=\Delta/12.5*\pi/4$.

Assuming that for a square signal, the 3rd harmonic is proportional to the sin(3*α), and subtracting the signals 1/3/5/7 from the signals 0/2/4/6, the remaining non-perfectly-cancelled 3LO level is proportional to $$\sin(3*\alpha_1) - \sin(3*\alpha_2) = \quad (1)$$
$$2*\cos\left(\frac{3*(\alpha_1+\alpha_2)}{2}\right)*\sin\left(\frac{3*(\alpha_1-\alpha_2)}{2}\right) = 2*\cos\left(\frac{3*\pi}{8}\right)*\sin(\varepsilon).$$

When ε is small, the 3rd harmonic LO signal level is proportional to ε, and the energy of the 3rd harmonic LO signal is proportional to $\epsilon^2$. Because CIM3 generated by the Tx RF variable gain amplifier (VGA) (245) is proportional to 3LO level, the CIM3 level should have a quadratic relationship to the LO duty ratio error/VCO duty ratio error.

Figure 7:
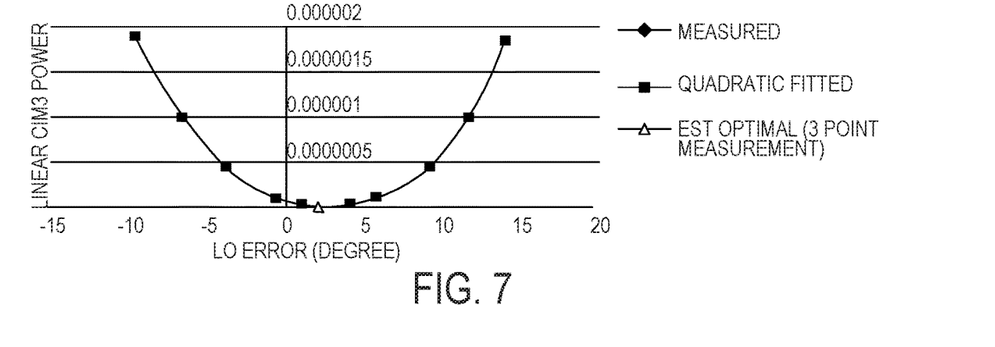
FIG. 7 is graph showing results of simulation of the relationship of signal power of an unwanted counter intermodulation signal versus local oscillator duty ratio signal error.
Figure 8:
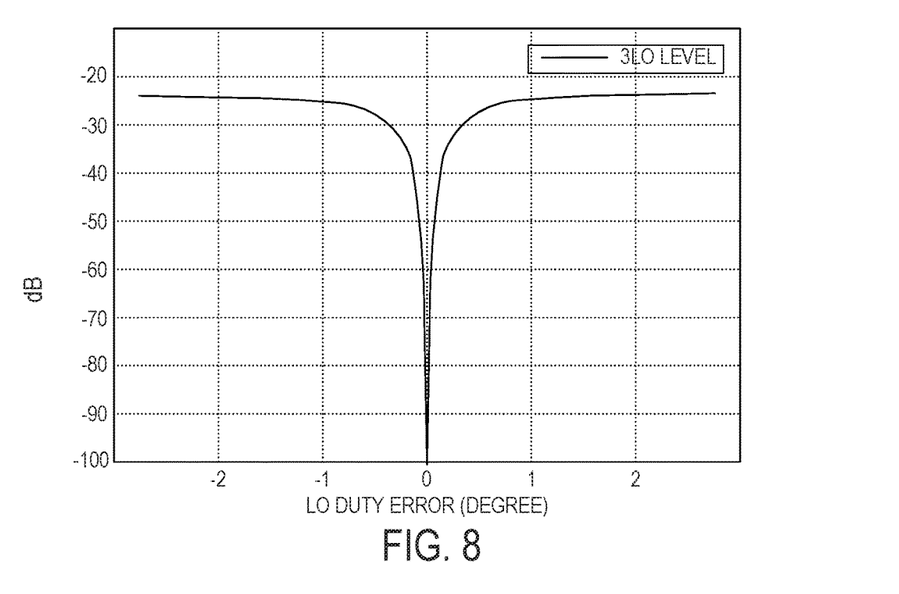
FIG. 8 is a graph showing the level of a third signal local oscillator harmonic versus local oscillator duty ratio error.

FIG. 7 is graph showing results of simulation of the relationship of signal power of CIM3 versus LO duty ratio signal error and the correction provided by sweeping the value of the DAC. The simulation confirms the quadratic relationship between the duty ratio error and the CIM3 harmonic. FIG. 8 is a graph showing the 3LO level vs. LO duty ratio error, which can be used as a guideline to set the proper correction code accuracy target. These concepts and equations follow for the fifth harmonic signal of the LO circuit.

Returning to FIG. 3, the LO circuit 320 is configured to generate a LO signal having a clock duty ratio of the LO signal determined according to CIM correction code or a LO duty ratio correction code. The above discussion shows that the RF transceiver circuitry 305 can be calibrated by adjusting the LO circuit 320 to reduce the CIM3 and CIM5 signal harmonics.

Figure 9:
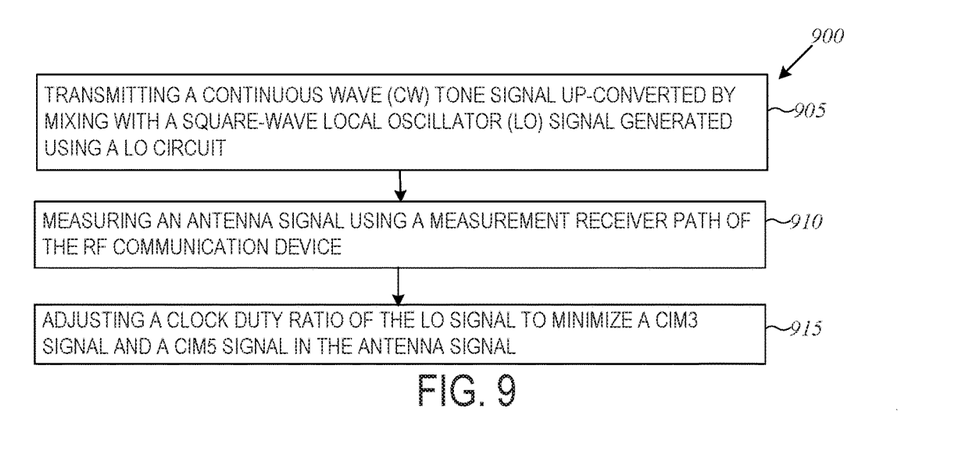
FIG. 9 is a flow diagram of an example embodiment of a method to calibrate the radio frequency transceiver circuitry.

FIG. 9 is a flow diagram of an example embodiment of a method to calibrate the RF transceiver circuitry 305 of FIG. 3. At 905, the broadband processing circuitry 310 initiates the transmission of a CW tone signal. At 910, the antenna Tx signal resulting from mixing the CW tone signal with the LO signal is measured using the measurement receiver path 335. In some embodiments, the CIM3 and CIM5 signal harmonics are measured through correlation. In certain embodiments, the baseband processing circuitry 310 determines a correlation value of CIM3 as $$Corr_{cim3} = \text{abs}\left(\frac{1}{N} * \sum_{n=1}^{N} Sig_{mrx}(n) * S_{cim3}(n)\right),$$

where $S_{cim3} = S^*_{cwsource}{}^3$ is the normalized targeted CIM3 signal, and the baseband processing circuitry 205 determines a correlation value of CIM5 as $$Corr_{cim5} = \text{abs}\left(\frac{1}{N} * \sum_{n=1}^{N} Sig_{mrx}(n) * S_{cim5}(n)\right),$$

where $S_{cim5} = S_{cwsource}{}^5$ is the normalized targeted CIM5 signal.

After the first measurement of CIM3 and CIM5, the baseband processing circuitry 310 changes the value of the LO duty ratio correction code to a specified LO duty ratio correction code value and initiates another measurement of the antenna signal. Because the LO duty ratio correction mechanism (e.g., the DAC circuit 140 and the correction circuit 150 of FIG. 1) is linearly proportional to the LO clock duty ratio, the correction value can be determined using three measurements. The baseband processing circuitry 310 iteratively changes the value of the LO duty ratio correction code to a specified LO duty ratio correction code value and repeats the measurement of the antenna signal until three measurement are obtained.

At 915 of FIG. 9, the clock duty ratio of the LO signal is adjusted by the calibration to reduce the CIM3 signal harmonic and the CIM5 signal harmonic in the antenna signal. Using the three measurements, the baseband processing circuitry 310 determines the optimal LO duty ratio correction code value that reduces the CIM3 and CIM5 signal harmonics in the antenna signal. In some embodiments, the baseband processing circuitry 310 calculates the optimal code (e.g., a DAC code) from the correlation measurements and based on the quadratic relationship of Equation (1). The baseband processing circuitry 310 calibrates the LO circuit using the optimal LO duty ratio correction code value.

Figure 10:
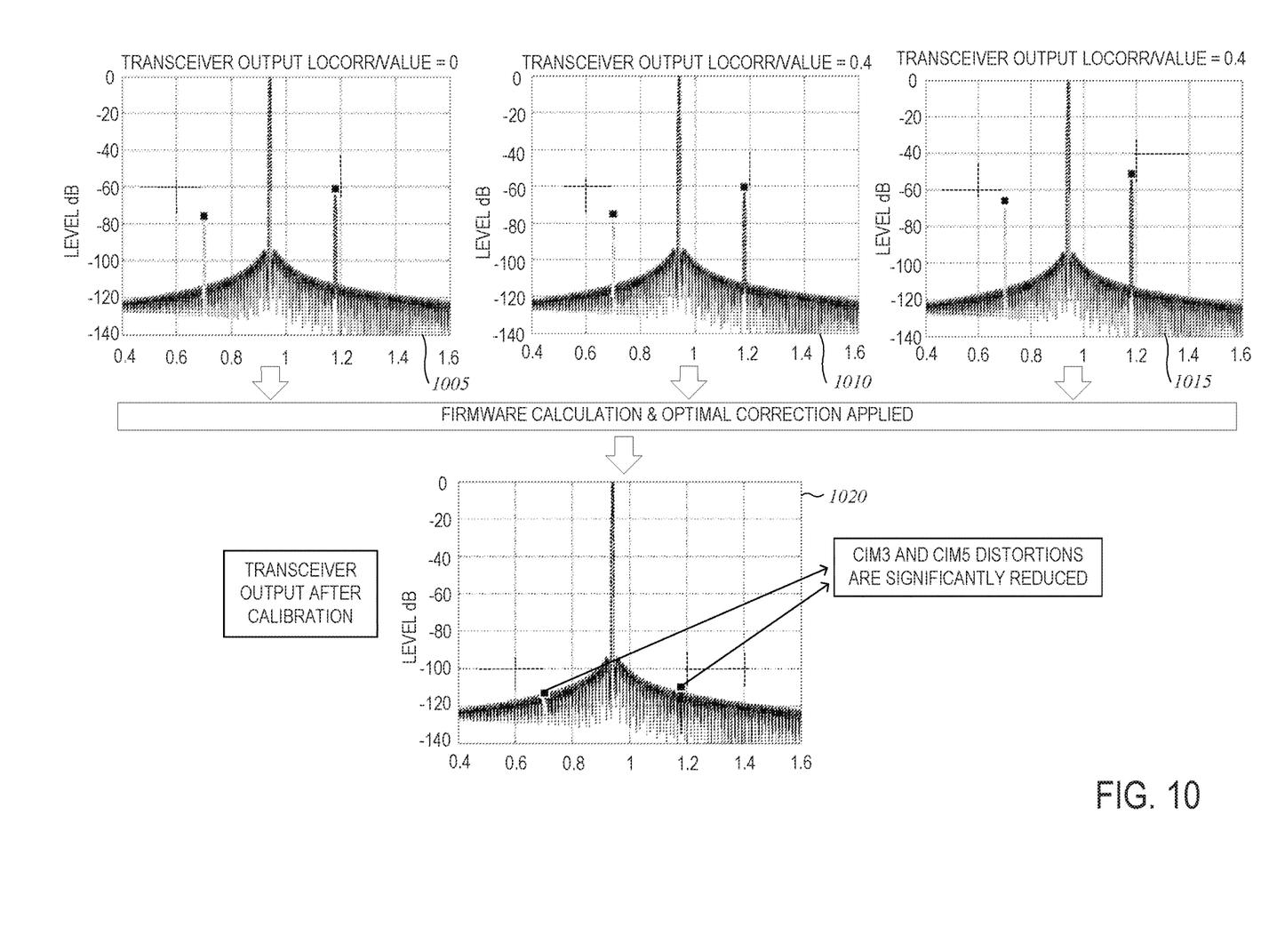
FIG. 10 are graphs of examples of measuring an antenna signal with different values for the local oscillator correction code and changing the local oscillator correction code to an optimal local oscillator correction code value.

FIG. 10 are graphs of examples of taking three measurements of the antenna signal with different values for the LO correction code and changing the LO oscillator correction code to an optimal LO correction code value. In graph 1005, a first LO oscillator correction code value of zero was used and the antenna signal was measured. The wanted Tx signal and the CIM3 and CIM5 signal harmonics are shown. In graph 1010, the LO oscillator correction code is changed to a second value. In the example, the second LO oscillator correction code is a negative value. In graph 1015, the LO oscillator correction code is changed to a third value. In the example, the second LO oscillator correction code is a positive value. Graph 1020 shows the results of changing the LO oscillator correction code to an optimal value calculated using the measurements of graphs 1005, 1010 and 1015. It can be seen that the amplitude of the CIM3 and CIM 5 harmonics are greatly reduced.

Returning to FIG. 3 although the device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the device 300 may be configured to communicate information using a broadband wireless access (BWA) network communication network such as, among other things, a Worldwide Interoperability for Microwave Access (WiMAX) communication network, a 3rd Generation Partnership Project (3GPP) Universal Terrestrial Radio Access Network (UTRAN) Long-Term-Evolution (LTE), a Long-Term-Evolution (LTE) communication network or a high speed downlink/uplink access (HSDPA/HSUPA) communication network, a universal mobile telecommunications system (UMTS) network, or a global system for mobile communications (GSM) network.

The systems, methods, and devices described herein include elements that provide an automatic calibration process that minimizes unwanted signal harmonics while allowing a minimal VCO clock speed. This significantly reduces the local oscillator distribution path power consumption for RF communication devices.

ADDITIONAL DESCRIPTION AND EXAMPLES

Example 1 includes subject matter, such as an apparatus, comprising radio frequency (RF) transceiver circuitry for electrical coupling to an antenna and including: a local oscillator (LO) circuit configured to generate a LO signal and a mixer circuit configured to mix a continuous wave (CW) tone signal with the LO signal; a measurement receiver path configured to measure an antenna signal, wherein the antenna signal includes the CW tone signal mixed with the LO signal;

and baseband processing circuitry electrically coupled to the measurement receiver path and configured to adjust a clock duty ratio of the LO signal to reduce one or more counter intermodulation (CIM) signals in the antenna signal.

In Example 2, the subject matter of Example 1 optionally includes an LO circuit configured to generate a square wave LO signal, and baseband processing circuitry configured to reduce a third order counter intermodulation (CIM3) signal and fifth order counter intermodulation (CIM5) signal in the antenna signal.

In Example 3, the subject matter of Example 2 optionally includes an LO circuit configured to generate a LO signal having a clock duty ratio of the LO signal determined according to a LO duty ratio correction code; wherein baseband processing circuitry configured to: iteratively change the value of the LO duty ratio correction code to a specified LO duty ratio correction code value and initiate a measurement of the antenna signal; determine a LO duty ratio correction code value that reduces the CIM3 and CIM5 signal harmonics in the antenna signal; and calibrate the LO circuit using the LO duty ratio correction code. Value.

In Example 4, the subject matter of Example 3 optionally includes a CW tone signal circuit configured to generate the CW tone signal, wherein the baseband processing circuitry is optionally configured to: initiate three measurements of amplitude of the CIM3 signal and the CIM5 signal in the antenna signal; and determine the LO duty ratio correction code value using the three measurements.

In Example 5, the subject matter of one or both of Examples 3 and 4 optionally includes an LO circuit configured to produce a change in the duty ratio of the LO signal that is linearly proportional to a change in value of the LO duty ratio correction code.

In Example 6, the subject matter of one or any combination of Examples 3-5 optionally includes an N-phase mixer circuit that generates N LO signals, wherein N is an integer greater than or equal to five (N≥5), and wherein the clock duty ratio of a calibrated LO signal is 100/N. In certain examples, N=8.

In Example 7, the subject matter of one or any combination of
Examples 2-6 optionally includes a measurement receiver path that includes filtering circuitry to isolate the CIM3 and CIM5 signal in the antenna signal.

In Example 8, the subject matter of one or any combination of Examples 1-7 optionally includes a voltage controlled oscillator (VCO) circuit electrically coupled to the LO circuit, wherein the mixer circuit is an N-phase mixer circuit, wherein N is an integer greater than or equal to five (N≥5), and wherein the frequency of a VCO signal used to generate the LO signal is N/2 times the frequency of the LO signal ($N/2*f_{LO}$).

In Example 9, the subject matter of one or any combination of Examples 1-8 optionally includes one or more antennas electrically coupled to the RF transceiver circuitry, and wherein the RF transceiver circuitry, the measurement receiver path, and the baseband processing circuitry are included in user equipment (UE) for communication using a cellular communication network.

Example 10 includes subject matter (such as a method, a means for performing acts, or a computer readable storage medium including instructions that, when executed by baseband processing circuitry of an RF communication device, cause the RF communication device to perform acts), or can optionally be combined with the subject matter of one or any combination of Examples 1-9 to include such subject matter, comprising transmitting a continuous wave (CW) tone signal up-converted by mixing with a square-wave local oscillator (LO) signal generated using a LO circuit; measuring an antenna signal using a measurement receiver path of the RF communication device; and adjusting a clock duty ratio of the LO signal to reduce one or both of a third order counter intermodulation (CIM3) signal and a fifth order counter intermodulation (CIM5) signal in the antenna signal.

In Example 11, the subject matter of Example 10 optionally includes: iteratively changing a LO duty ratio correction code value of the LO circuit to specified LO duty ratio correction code values and re-measuring the antenna signal, wherein changing a LO duty ratio correction code of the LO circuit changes a clock duty ratio of the LO signal; and determining a LO duty ratio correction code value that reduces the CIM3 and CIM5 signal in the antenna signal and calibrating the UE using the determined LO duty ratio correction code value.

In Example 12, the subject matter of Example 11 optionally includes obtaining three measurements of amplitude of the CIM3 signal and the CIM5 signal; and determining the LO duty ratio correction code value using the three measurements.

In Example 13, the subject matter of one or both of Examples 11 and 12 optionally includes changing a value of the LO duty ratio correction code that produces a change in the duty ratio of the LO signal linearly proportional to the change in value of the LO duty ratio correction code.

In Example 14, the subject matter of one or any combination of Examples 11-13 optionally includes changing values of the LO duty ratio correction code to specified correction code values that are mapped to error in in the duty ratio of the LO signal according to a quadratic function.

In Example 15, the subject matter of one or any combination of Examples 11-14 optionally includes mixing the CW tone signal with the LO signal using an N-phase mixer circuit that generates N LO signals, wherein N is an integer greater than or equal to five (N≥5), and wherein the clock duty ratio of a calibrated LO signal is 100/N.

In Example 16, the subject matter of Example 15, optionally includes generating the LO signal using a voltage controlled oscillator (VCO), wherein a frequency of the VCO is N/2 times the local oscillator frequency.

Example 17 includes subject matter, such as a computer readable storage medium including instructions that, when executed by baseband processing circuitry of an RF communication device, cause the RF communication device to: generate a continuous wave (CW) tone signal in a calibration mode, wherein the CW tone signal is up-converted by circuitry of the RF communication device by mixing with a square-wave local oscillator (LO) signal to generate an antenna signal; initiate one or more measurements of the antenna signal; and change a value of a correction code to adjust a clock duty ratio of the LO signal to reduce one or both of a third order counter intermodulation (CIM3) signal and a fifth order counter intermodulation (CIM5) signal in the antenna signal.

In Example 18, the subject matter of Example 17 optionally includes instructions that cause the RF communication device to iteratively change a LO duty ratio correction code value of the LO circuit to specified LO duty ratio correction code values and re-measuring the antenna signal, wherein changing a LO duty ratio correction code of the LO circuit changes a clock duty ratio of the LO signal; and determine a LO duty ratio correction code value that reduces the CIM3 and CIM5 signals in the antenna signal and calibrating the UE using the determined LO duty ratio correction code value.

In Example 19, the subject matter of Example 18 optionally includes instructions that cause the RF communication device to obtain three measurements of amplitude of one or both of the CIM3 signal and the CIM5 signal; and determine the LO duty ratio correction code value using the three measurements.

In Example 20, the subject matter of one or both of Examples 18 and 19 optionally includes instructions that cause the RF communication device to change a value of the LO duty ratio correction code that produces a change in the duty ratio of the LO signal linearly proportional to the change in value of the LO duty ratio correction code.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus comprising:
    baseband processing circuitry;
    radio frequency (RF) transceiver circuitry for transmitting an outgoing RF signal based on a local oscillator (LO) signal produced by a LO and a continuous wave (CW) tone signal during a calibration mode; and
    a measurement receiver circuit configured to receive the outgoing RF signal and measure one or more counter intermodulation (CIM) signals in the outgoing RF signal;
    wherein the LO is configured to generate a square wave LO signal having a clock duty ratio of the LO signal determined according to a LO duty ratio correction code; wherein the baseband processing circuitry is electrically coupled to the measurement receiver and is configured to:
    iteratively change the value of the LO duty ratio correction code to a specified LO duty ratio correction code value and initiate a measurement of the outgoing RF signal;
    determine a LO duty ratio correction code value that reduces a third order counter intermodulation (CIM3) signal and fifth order counter intermodulation (CIM5) signal in the outgoing RF signal; and
    calibrate the LO circuit using the determined LO duty ratio correction code value.

2. The apparatus of claim 1, including a CW tone signal circuit configured to generate the CW tone signal, wherein the baseband processing circuitry is configured to: initiate three measurements of amplitude of the CIM3 signal and the CIM5 signal in the antenna signal; and determine the LO duty ratio correction code value using the three measurements.

3. The apparatus of claim 1, wherein the LO is configured to produce a change in the duty ratio of the LO signal that is linearly proportional to a change in value of the LO duty ratio correction code.

4. The apparatus of claim 1, wherein the RF transceiver circuitry includes an N-phase mixer circuit that generates N LO signals, wherein N is an integer greater than or equal to five (N>5), and wherein the clock duty ratio of a calibrated LO signal is 100/N.

5. The apparatus of claim 1, wherein the measurement receiver path includes filtering circuitry to isolate the CIM3 and CIM5 signals in the outgoing RF signal.

6. The apparatus of claim 1, including one or more antennas electrically coupled to the RF transceiver circuitry, and wherein the RF transceiver circuitry, the measurement receiver path, and the baseband processing circuitry are included in user equipment (UE) for communication using a cellular communication network.

7. An apparatus comprising:
    baseband processing circuitry;
    radio frequency (RF) transceiver circuitry for transmitting an outgoing RF signal based on a local oscillator (LO) signal produced by a LO and a continuous wave (CW) tone signal during a calibration mode;
    a voltage controlled oscillator (VCO) circuit electrically coupled to the LO, wherein the mixer circuit is an N-phase mixer circuit, wherein N is an integer greater than or equal to five (N>5), and wherein the frequency of a VCO signal used to generate the LO signal is N/2 times the frequency of the LO signal (N/2*$f_{LO}$); and
    a measurement receiver circuit configured to receive the outgoing RF signal and measure one or more counter intermodulation (CIM) signals in the outgoing RF signal;
    wherein the baseband processing circuitry is electrically coupled to the measurement receiver and is configured to adjust a clock duty ratio of the LO signal to reduce one or more counter intermodulation (CIM) signals in the outgoing RF signal.

8. A method of controlling operation of a radio frequency (RF) communication device, the method comprising:
- transmitting a continuous wave (CW) tone signal up-converted by mixing with a square-wave local oscillator (LO) signal generated using a LO circuit;
- measuring an outgoing RF signal using a measurement receiver of the RF communication device that is coupled to a transmitting antenna;
- iteratively changing a LO duty ratio correction code value of the LO circuit to specified LO duty ratio correction code values and re-measuring the antenna signal, wherein changing a LO duty ratio correction code of the LO changes a clock duty ratio of the LO signal; and
- determining a LO duty ratio correction code value that reduces a third order counter intermodulation (CIM3) signal and a fifth order counter intermodulation (CIM5) signal in the outgoing RF signal and calibrating the UE using the determined LO duty ratio correction code value.

9. The method of claim 8, wherein measuring the outgoing RF signal and adjusting the duty ratio of the LO signal includes:
- obtaining three measurements of amplitude of the CIM3 signal and the CIM5 signal; and
- determining the LO duty ratio correction code value using the three measurements.

10. The method of claim 8, wherein changing a value of the LO duty ratio correction code produces a change in the duty ratio of the LO signal linearly proportional to the change in value of the LO duty ratio correction code.

11. The method of claim 8, wherein the specified LO duty ratio correction code values are mapped to error in the duty ratio of the LO signal according to a quadratic function.

12. The method of claim 8, including mixing the CW tone signal with the LO signal using an N-phase mixer circuit that generates N LO signals, wherein N is an integer greater than or equal to five (N>5), and wherein the clock duty ratio of a calibrated LO signal is 100/N.

13. The method of claim 12, generating the LO signal using a voltage controlled oscillator (VCO), wherein a frequency of the VCO is N/2 times the local oscillator frequency.

14. A non-transitory computer readable storage medium including instructions that, when executed by the baseband processing circuitry of an RF communication device, cause the RF communication device to:
- generate a continuous wave (CW) tone signal in a calibration mode, wherein the CW tone signal is up-converted by circuitry of the RF communication device by mixing with a square-wave local oscillator (LO) signal to generate an outgoing RF signal;
- initiate one or more measurements of the outgoing RF signal;
- iteratively change the LO duty ratio correction code value of a LO to specified LO duty ratio correction code values and re-measuring the outgoing RF signal, wherein changing a LO duty ratio correction code of the LO circuit changes a clock duty ratio of the LO signal; and
- determine a LO duty ratio correction code value that reduces a third order counter intermodulation (CIM3) signal and a fifth order counter intermodulation (CIM5) signal in the outgoing RF signal and calibrate the UE using the determined LO duty ratio correction code value.

15. The non-transitory computer readable storage medium of claim 14, including instructions that, when executed by the baseband processing circuitry of the RF communication device cause the RF communication device to:
- initiate three measurements of amplitude of one or both of the CIM3 signal and the CIM5 signal; and
- determine the LO duty ratio correction code value using the three measurements.

16. The non-transitory computer readable storage medium of claim 14, including instructions that, when executed by the baseband processing circuitry of the RF communication device cause the RF communication device to:
- change a value of the LO duty ratio correction code that produces a change in the duty ratio of the LO signal linearly proportional to the change in value of the LO duty ratio correction code.

* * * * *

UNITED STATES PATENT AND TRADEMARK OFFICE
CERTIFICATE OF CORRECTION

PATENT NO. : 9,900,030 B2
APPLICATION NO. : 15/097898
DATED : February 20, 2018
INVENTOR(S) : Jiang et al.

It is certified that error appears in the above-identified patent and that said Letters Patent is hereby corrected as shown below:

In the Specification

In Column 3, Line 6, delete "($N \geq 5$)," and insert --($N > 5$),-- therefor

In Column 6, Line 12, delete "$X=0$)," and insert --$X=0°$),-- therefor

In Column 7, Line 15, delete "205" and insert --310-- therefor

Signed and Sealed this
Twenty-fifth Day of June, 2019

Andrei Iancu
*Director of the United States Patent and Trademark Office*